R. E. DUNHAM.
METHOD OF UNITING THE EDGE PORTIONS OF METAL SHEETS.
APPLICATION FILED FEB. 16, 1914.
1,248,830.
Patented Dec. 4, 1917.
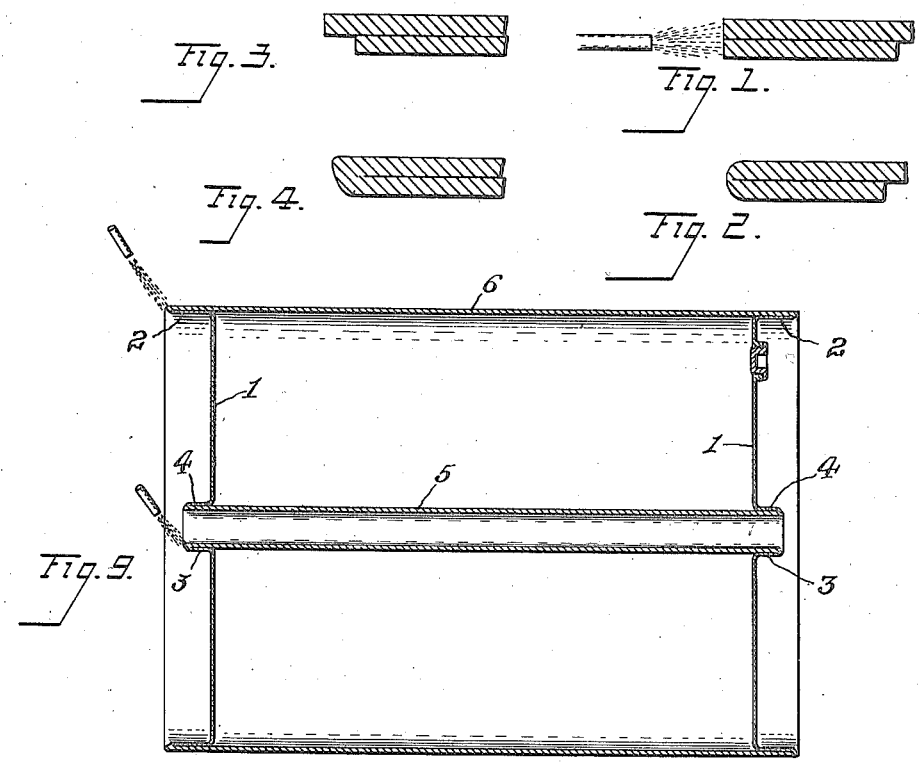
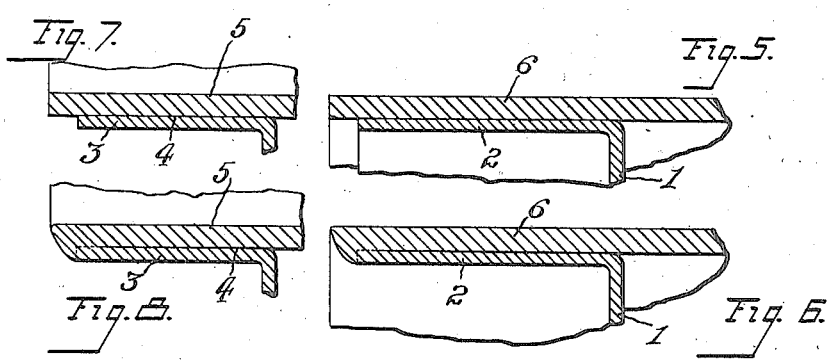

UNITED STATES PATENT OFFICE.

RAY E. DUNHAM, OF BEREA, OHIO, ASSIGNOR TO THE DUNHAM COMPANY, OF BEREA, OHIO, A CORPORATION OF OHIO.

METHOD OF UNITING THE EDGE PORTIONS OF METAL SHEETS.

1,248,830.

Specification of Letters Patent. Patented Dec. 4, 1917.

Application filed February 16, 1914. Serial No. 818,909.

*To all whom it may concern:*

Be it known that I, RAY E. DUNHAM, a citizen of the United States, resident of Berea, county of Cuyahoga, and State of Ohio, have invented a new and useful Improvement in Methods of Uniting the Edge Portions of Metal Sheets, of which the following is a specification, the principle of the invention being herein explained and the best mode in which I have contemplated applying that principle, so as to distinguish it from other inventions.

My invention relates to methods of uniting the edge-portions of metal sheets by welding, its object being to effect such a union in an efficient and economical manner and particularly for the purpose of forming a water-tight joint between the flanges and the parts contiguous thereto of water-ballast lawn rollers. It will, of course, be understood that the same method may be employed wherever it is desirable to effect an efficient union between contiguous edge-portions of metal sheets lying in face-to-face contact.

The said invention consists of a method of forming such joint hereinafter fully described and particularly set forth in the claims.

The annexed drawing and the following description set forth in detail the method embodying my invention together with the resultant product, the disclosed method, however, constituting but one of various forms in which the principle of the invention may be applied.

In said annexed drawing:—

Figure 1 represents a cross-sectional view of two fragmentary portions of steel plate in face-to-face contact, such plates being arranged in accordance with the heretofore well-known and accepted practice.

Fig. 2 is a similar section showing the character of the union effected between the edge-portions of said two plates, in accordance with the heretofore well-known and accepted practice.

Fig. 3 represents a cross-sectional view of the edge-portions of two steel plates of equal thickness arranged according to my invention and in the position which they are caused to occupy prior to the welding operation.

Fig. 4 represents a similar section of said edge-portions of said sheets after the welding operation has been effected.

Fig. 5 represents an axial section of a fragmentary portion of the outer shell and one of the heads of a water-ballast lawn roller in the position which they occupy prior to the welding operation and arranged in accordance with my invention.

Fig. 6 is a view similar to Fig. 5 after the welding operation has taken place.

Fig. 7 is an axial sectional view of a fragmentary portion of the central part of one of the heads and the axial tube of such lawn roller, arranged in position prior to the welding operation.

Fig. 8 is a view similar to Fig. 7 showing the parts after the welding operation has been completed.

Fig. 9 represents an axial section of the drum of a water-ballast roller constructed in accordance with my invention.

In the practice heretofore employed in welding the outer flanges of a water ballast roller to the ends of the cylindrical shell, the heads have been set so as to bring the outer ends of said shell flush with the outer ends of said flanges, as shown in Fig. 1. An oxy-acetylene flame was then applied to the ends of the shell and flanges, as shown in Fig. 1, and the metal thereof fused until a joint was effected. The formation of such joint was sometimes facilitated with the use of what is called welding iron, this iron being applied to the joint in much the same manner as solder is applied in a soldering operation. Such described process resulted in a joint such as is illustrated in Fig. 2 and it has been found that only a very small portion of the metal mass became fused or welded and only a very short joint thereby effected. Any blow of moderate strength applied to such a joint effected its separation and hence permitted leakage of the water from the interior of the roller.

I have found, however, that by arranging these edge-portions of the flanges and drum so that one may overlap the other, as is shown in Fig. 3, and then applying the oxy-acetylene flame to the projecting metal periphery, while such projecting metal is in a position above the metal of the other sheet, the projecting mass is melted down and runs over and opposite the end of the other plate or sheet, as shown in Fig. 4, this mass at the same time fusing and uniting with such end of the other sheet or plate. A very much greater mass of metal is thus fused to form the joint and a consequently very much more efficient and stable joint produced.

As is well-known, the metal of the heads of water rollers is usually less in thickness than the metal of the shell or the metal of the inner tube, as shown in Fig. 9.

As will be observed from such figure, each head 1 is formed with an outer flange 2 and an inner central flange 3 surrounding a central opening 4. An axial tube 5 passes through these central openings and through the flanges 3.

In applying the above described process to the formation of a union between the said outer flanges 2 and the shell 6, I inset the heads so as to cause the shell to project beyond the thinner metal of the flanges 2, as shown in Fig. 5. The oxy-acetylene flame is then directed upon the end of the shell, as shown in Fig. 9, and the welding operation is performed as described in connection with the parts illustrated in Figs. 3 and 4. When the operation is completed, the weld will be formed as illustrated in Fig. 6, in which the dotted lines indicate the original outline of the edge-portion of the flange.

In a like manner the ends of the tube 5 are united with the flanges 3, the end of the tube being caused to project beyond the end of the flange as shown in Fig. 7, and the resultant joint being illustrated in Fig. 8.

In applying the flame, such portion of the structure should be selected in which the overlapping metal is above the metal of the other element, as is shown in Fig. 9. As soon as all the overlapping and upper metal is welded, the roller may be turned so as to bring other portions in proper position, as will be readily understood.

It will thus be seen that a joint is effected in which the flanges of the thicker metal project beyond the flanges of the thinner metal, overlap same and form a mass opposite the end portion of the flange of thinner metal.

In the above described manner, I obtain an efficient and permanent water-tight union of the parts.

The described welding process may be carried out with the addition of welding iron, as will be readily understood by those skilled in the art.

Having fully described my invention, what I claim and desire to secure by Letters Patent is:—

1. The method of uniting the edge-portions of metal sheets which consists in placing such edge-portions in face-to-face contact with the face of one such portion extending beyond the contiguous face of the other, and subjecting the ends of such edge-portions to a fusing heat, the application of such heat to the edge-portion so extending being made such as to effect the fusion of more of its mass than that of the other edge-portion.

2. The method of uniting the edge-portions of metal sheets of different thickness, which consists in placing such edge-portions in face-to-face contact with the face of the sheet of greater thickness extending beyond the contiguous face of the other edge-portion, and then subjecting the ends of such edge-portions to a fusing heat, the application of such heat to the edge-portion so extending being made such as to effect the fusion of more of its mass than is effected in the other edge-portion.

3. The method of uniting the edge portions of metal sheets, differing in thickness, which consists in placing two such sheets in face contact with the thicker one above and projecting beyond or over the thinner, and directing a flame in a downward direction upon and against the thicker overhanging edge, whereby the thicker sheet receives more heat directly than the thinner and both tend to fuse to welding temperature at substantially the same time.

4. The method of welding edges of metal sheets together which consists in placing said sheets horizontally with their faces in contact and the edge of the upper extending beyond the edge of the lower and directing a welding flame downward, whereby the upper sheet is made to receive more heat than the lower, and the upper edge to fuse and flow down into welding contact with the heated edge of the lower sheet.

5. The method of welding edges of metal sheets together which consists in placing said sheets horizontally with their faces in contact and the edge of the upper extending beyond the edge of the lower and directing a welding flame downward upon substantially the area of the projecting part, whereby the upper sheet is made to receive more heat than the lower, and the upper projecting part to fuse with the heated edge of the lower sheet.

Signed by me, this 12th day of February, 1914.

RAY E. DUNHAM.

Attested by—
A. F. EHRBAR,
J. B. DUNHAM.